No. 792,293. PATENTED JUNE 13, 1905.
H. J. SPRINGER.
POTATO PLANTER.
APPLICATION FILED NOV. 9, 1904.
2 SHEETS—SHEET 2.
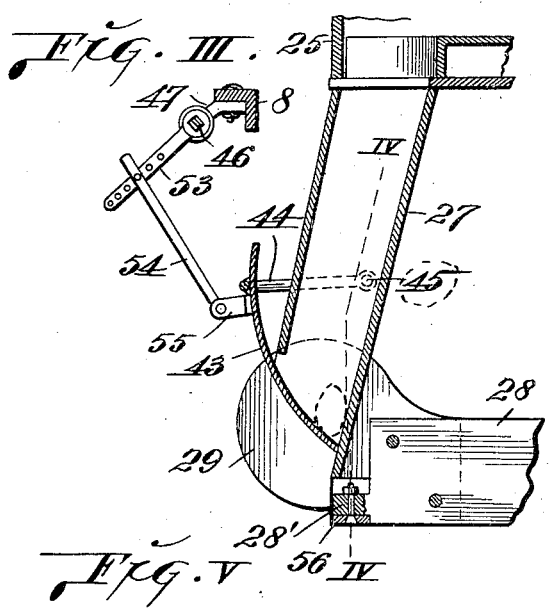
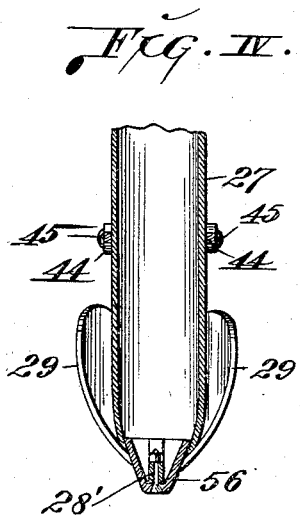
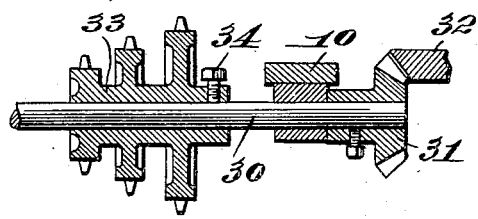
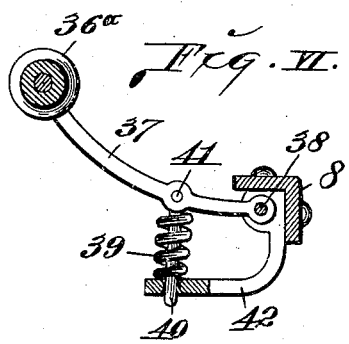
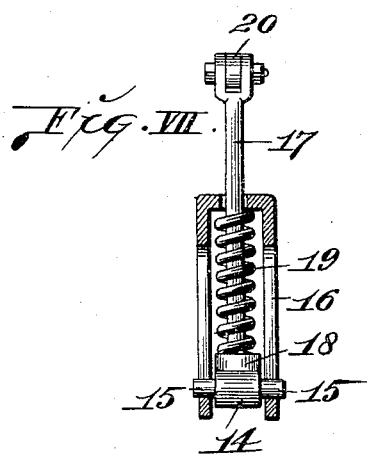
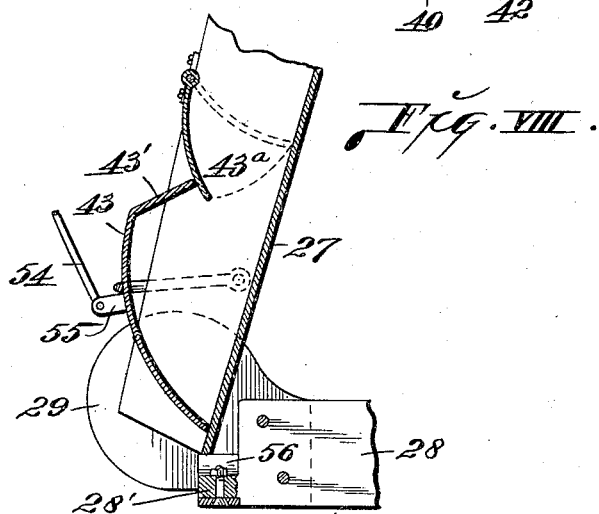
Attest:
M. P. Smith
Blanche Hogan
Inventor:
H. J. Springer
By Knight Bros. attys.

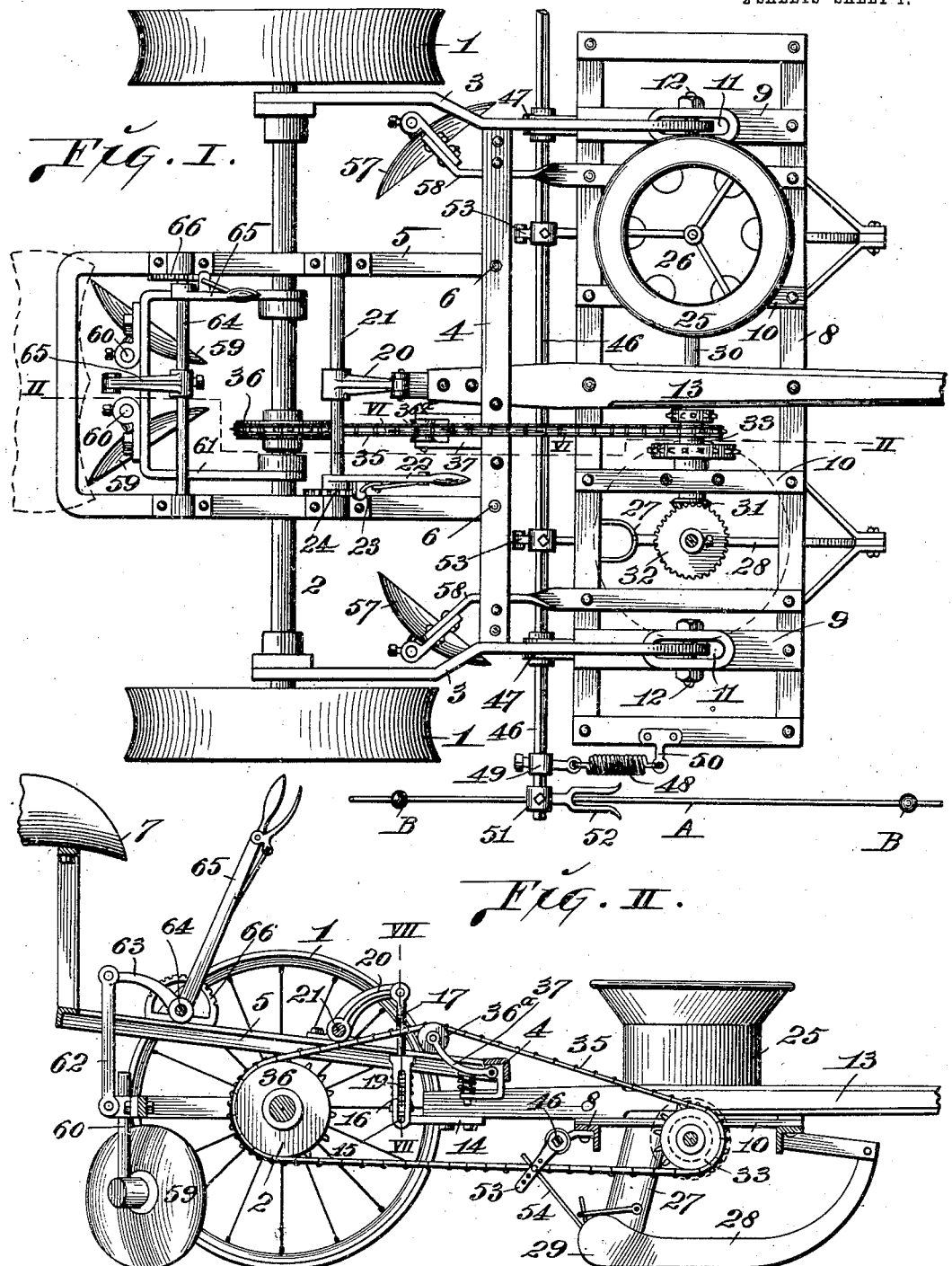

No. 792,293. Patented June 13, 1905.

UNITED STATES PATENT OFFICE.

HENRY J. SPRINGER, OF EDWARDSVILLE, ILLINOIS, ASSIGNOR TO SPRINGER BROS. MFG. CO., OF EDWARDSVILLE, ILLINOIS, A CORPORATION.

POTATO-PLANTER.

SPECIFICATION forming part of Letters Patent No. 792,293, dated June 13, 1905.

Application filed November 9, 1904. Serial No. 231,969.

*To all whom it may concern:*

Be it known that I, HENRY J. SPRINGER, a citizen of the United States, residing in Edwardsville, in the county of Madison and State of Illinois, have invented certain new and useful Improvements in Potato-Planters, of which the following is a full, clear, and exact description, reference being had to the accompanying drawings, forming part of this specification.

My invention relates to a machine for planting potatoes and through the medium of which the potatoes may be deposited uniformly in furrows opened in the soil therefor during the operation of the planter.

Figure I is a top or plan view of my planter. Fig. II is a longitudinal vertical section taken on line II II, Fig. I. Fig. III is an enlarged vertical section taken through one of the dropper-chutes of the planter and the rear end of the corresponding furrow-opening runner and also through the dropping-gate associated with said chute and the means through which said gate is controlled. Fig. IV is an enlarged vertical cross-section taken on line IV IV, Fig. III. Fig. V is an enlarged longitudinal section of the operating-gear associated with the valves of the seedboxes. Fig. VI is an enlarged longitudinal section taken on line VI VI, Fig. I. Fig. VII is an enlarged vertical cross-section taken on line VII VII, Fig. II; and Fig. VIII is a vertical section taken through one of the dropper-chutes and illustrating a modification of the chute-controlling gates.

1 designates the ground-wheels of my planter, which support an axle 2, rigidly mounted therein.

3 designates draft members loosely fitted to the axle 2 at their rear ends and having connections at their forward ends to be hereinafter specified.

4 is a cross-beam connected at its ends to the draft members 3 and extending transversely of the planter forward of the axle 2.

5 is a U-shaped frame, the forward ends of the arms of which are secured at 6 to the cross-beam 4, the said frame extending rearwardly above the axle 2 and carrying a driver's seat 7.

8 designates the runner-carrying frame of the planter, which is provided with transverse cross-bars 9 and 10. The cross-bars 9 are provided with eyes 11, that receive the forward ends of the draft members 3, the members being loosely held within said eyes by pivot-bolts 12, seated in the cross-bars.

13 designates the draft-tongue of the planter, which is rigidly connected to the runner-carrying frame 8 and the rear end of which extends beyond said frame to a position within the rear frame 5. 14 is a strap secured to the rear end of the draft-tongue and provided with laterally-projecting pivot-studs 15. (See Figs. II and VII.) 16 is a slotted yoke in which the pivot-studs 15 operate. 17 is a reciprocating rod passing loosely through the yoke 16 and provided at its lower end with a head 18, that rests upon the rear end of the strap 14. This rod is surrounded by an expansion-spring 19, which is confined between the head of the yoke and the head of the reciprocating rod. The upper end of the rod 17 is pivoted to a rocker-arm 20, that is fixed to a rock-shaft 21, journaled in boxes on the rear frame 5. 22 is a hand-lever fixed to the rock-shaft 21 and provided with a latch 23, (see Fig. I,) that is adapted to engage a rack 24, carried by the rear frame 5 to provide for the retention of the rock-shaft 21 in a set position. These features of construction provide means whereby the rear end of the draft-tongue may be held depressed when the spring 19 is in expanded condition, and the tongue may be relieved to ascend to a limited degree when the reciprocating rod 17 is elevated through the medium of the rock-shaft 21 and its hand-lever to compress the spring 19, the said spring serving the additional purpose of cushioning the rear end of the tongue.

25 designates the seedboxes or hoppers, into which the potatoes are placed to be carried by the planter. These boxes are provided with apertured valve-bottoms 26. (See Figs. I and III.)

27 designates dropper-chutes leading from the outlets at the bottom of the feed-boxes and having open lower ends.

28 designates the furrow-opening runners, that are provided at their rear ends with diverging wings 29, that straddle the lower open ends of the dropper-chutes. The forward ends of the furrow-opening runners are connected to the runner-carrying frame 8.

The seedbox valves or disks 26 are rotatably mounted at the bottoms of the boxes, and rotation is imparted to them through the medium of the following mechanism: 30 is a shaft journaled in bearings supported by the runner-carrying frame cross-bars 10 and having fixed thereto beveled pinions 31, that mesh with beveled pinions 32, fixed to the shafts of the valves 26, (see Figs. I and V,) whereby the valves of both seedboxes are operated in common by the single shaft 30. 33 is a multiple sprocket-wheel, adjustably fixed to the shaft 30 by a set-screw 34 or other suitable means, that will permit of the sprocket-wheel being shifted longitudinally on said shaft. Either section of the multiple sprocket-wheel is adapted to receive an endless drive-chain 35, (see Figs. I and II,) that leads to a driving sprocket-wheel 36, fixed to the planter-axle 2. The object in providing the sprocket-wheel 33 in multiple is to secure varying degrees of speed of rotation of the shaft 30, and consequently of the seedbox-valves, so that the potatoes may be dropped from the seedboxes with varying degrees of frequency. The endless chain 35 is illustrated in Fig. I as operating upon the intermediate section of the multiple sprocket-wheel, and when so operating a medium speed of rotation is secured. Should it be desired to drop the potatoes with greater frequency, the multiple sprocket-wheel is shifted on the shaft 30 to permit the endless chain to operate on the smallest section of the wheel, and if they are to be planted with less frequency the sprocket-wheel is shifted reversely to permit of the application of the endless chain to the largest section of the wheel. To compensate for the variation in the size of the sections of the multiple sprocket-wheel and maintain the endless driving-chain in a taut condition irrespective of the section of said wheel, on which it operates, I provide a chain-tightener that consists of an idler 36, on which the chain travels and which is carried by a swinging arm 37, (see Figs. I, II, and VI,) the arm being pivoted at 38 to the cross-beam 4. This idler-supporting arm is upheld by an expansion-spring 39, surrounding a finger 40, pivoted at 41 to the arm and operating loosely through a bracket 42, attached to the cross-beam 4.

43 designates dropping-gates, the free ends of which operate within the lower ends of the dropper-chutes 27, the gates being pivotally supported by swing-arms 44, that are pivoted to the chutes at 45 (see Figs. III and IV) and extend rearwardly from their pivotal points to the gates, so that the gates may swing rearwardly when opened. The dropping-gates are oscillated through the medium of the following mechanism:

46 is a shaft journaled in brackets 47, secured to the rear bar of the runner-carrying frame 8. (See Figs. I and III.) The rock-shaft 46 is held under restraint by a retractile spring 48, secured to an arm 49, rigidly mounted on the shaft, and at the other end to an arm 50, attached to the end of the runner-carrying frame 8.

51 is a collar secured to the rock-shaft and provided with a fork 52, that is adapted to be engaged by the buttons B of a check-wire A of common form and through the medium of which the shaft 46 is rocked.

53 designates perforated rockers fixed to the rock-shaft 46, and 54 designates links pivoted to said rockers and also pivotally connected to ears 55, carried by the dropping-gates 43. During the operation of the planter the rock-shaft 46 is oscillated when the check-wire buttons come in contact with the fork 52, and as soon as the gage-button in such instance has been passed the rock-shaft is returned to normal position by the retractile spring 48. When the rock-shaft is oscillated, it imparts an oscillatory movement to the dropping-gates 43, and the potatoes just previously deposited on said gates, as indicated by dotted lines in Fig. III, are permitted to fall through the lower ends of the chutes and enter furrows produced by the runners 28, the gates immediately resuming their former positions to catch the next potatoes dropped into the chutes through the seedbox-valves 26.

The furrow-opening shoes 28, which are positioned in advance of the dropper-chutes 27, do not ordinarily create and maintain furrows of sufficient dimensions to permit of seed-potatoes or "sets" being deposited at the bottom of the furrows, and to produce furrows of the requisite dimensions I utilize V-shaped shoes 56, (see Figs. III and IV,) that are secured to extension-arms 28' at the rear ends of the runners and occupy positions immediately in front of the forward lower edges of the dropper-chutes. These shoes act to spread the soil in the furrows immediately in advance of the potatoes dropped thereinto before the soil can return into the furrows from their sides.

57 designates disk shovels that are journaled to carrier-bars 58, attached to and projecting from the runner-frame 8. These shovels serve to throw the soil at the sides of the furrows made by the runners 28 to partially cover the potatoes deposited in the furrows.

59 designates shovels that act to throw the soil outwardly on lines between the two furrows produced by the runners of the planter, thereby completing the covering action. The shovels 59 are journaled to axle-arms 60, mounted in boxes carried by an oscillating frame 61, having its arms loosely fitted to the planter-axle 2. The frame 61 and shovels carried thereby through the medium of the axle-arms may be readily raised from the ground at will through the medium of a lifting-link 62, that is connected to a rocker-arm 63, fixed to a rock-shaft 64, mounted in bearing-boxes on the rear frame 5. The rock-shaft 64 is equipped with a hand-lever 65, provided with a latch that is adapted for engagement with a rack 66, mounted on the frame 5, whereby the rock-shaft may be held from rotation when the shovels 59 are either in lowered or elevated positions.

In Fig. VIII, I have illustrated a modification in which the dropping-gate 43 is supplemented by an upper auxiliary dropping-gate 43ⁿ, pivoted to the dropper-chute at the rear side thereof and adapted to descend into engagement with an extension 43' at the upper end of the lower gate 43. When in the use of this construction the lower gate is swung open to drop a potato, the extension 43' carries the upper gate inwardly and upwardly into the closed position seen in dotted lines, so that it will catch the next descending potato, and when the lower gate resumes its closed position the potato upheld by the upper gate is permitted to fall, due to the descent of the upper gate, and it is caught by the lower gate to be deposited in the ground when said lower gate is again opened. This arrangement precludes the escape of a second potato from the chute while the lower gate is in open condition to permit the deposit of the one intended to be deposited.

I wish to again call attention to the fact that the dropping-gates 43 of my planter are pivotally connected to the dropper-chutes in advance of the gates and that therefore the gates must necessarily swing upwardly and rearwardly when freeing potatoes upheld thereby. By thus maintaining the gates there is no liability of dragging seed or of interference being offered to their movement by the soil surrounding the lower end of the chutes, such as occurs in planters where the course of movement of the gate is otherwise than that in my improvement.

I claim as my invention—

1. In a potato-planter, the combination of a pair of ground-wheels, an axle mounted in said wheels, a runner-carrying frame, means for loosely connecting said runner-carrying frame to said axle, runners carried by said frame, a rear frame having connection with said runner-carrying frame and axle-connecting means, and a draft-tongue connected to said runner-carrying frame and having loose connection with said rear frame, substantially as set forth.

2. In a potato-planter, the combination of a pair of ground-wheels, an axle mounted in said wheels, a runner-carrying frame, means for loosely connecting said runner-carrying frame to said axle, runners carried by said frame, a rear frame having connection with said runner-carrying frame and axle-connecting means, a draft-tongue connected to said runner-carrying frame, means for connecting said draft-tongue to said rear frame, and a cushion-spring in said connecting means, substantially as set forth.

3. In a potato-planter, the combination of a pair of ground-wheels, an axle mounted in said wheels, a runner-carrying frame, means for loosely connecting said runner-carrying frame to said axle, runners carried by said frame, a rear frame having connection with said runner-carrying frame and axle-connecting means, a draft-tongue connected with said runner-carrying frame, a strap fitted to the rear end of said tongue, a slotted yoke supported by said rear frame and having engagement with said strap, and a cushion-spring in said yoke exerting pressure against said strap, substantially as set forth.

4. In a potato-planter, the combination of a pair of ground-wheels, an axle mounted in said wheels, a runner-carrying frame, means for loosely connecting said runner-carrying frame to said axle, runners carried by said frame, a rear frame having connection with said runner-carrying frame and axle-connecting means, a draft-tongue connected to said runner-carrying frame, a strap at the rear end of said tongue, a slotted yoke having engagement with said strap, a reciprocating rod supported by said rear frame, and a spring surrounding said reciprocating rod within said yoke, substantially as set forth.

5. In a potato-planter, the combination of a pair of ground-wheels, an axle mounted in said wheels, a runner-carrying frame, runners carried by said frame, draft members loosely mounted on said axle and having pivotal connection with said runner-carrying frame, a cross-beam connecting said draft members, a rear frame carried by said cross-beam, and a tongue connected to said runner-carrying frame and having loose connection with said rear frame, substantially as set forth.

6. In a potato-planter, the combination of a pair of ground-wheels, an axle mounted in said ground-wheels, a runner-carrying frame, runners carried by said frame, seed-dropping mechanism, a pair of outer soil-turning shovels, and a pair of inner soil-turning shovels, and means whereby said shovels are carried, substantially as set forth.

7. In a potato-planter, the combination of a dropper-chute, and a dropping-gate journaled in said chute and pivoted thereto at a point forward of its location in the chute, substantially as set forth.

8. In a potato-planter, the combination of a dropper-chute, a dropping-gate located in said chute, and arms extending forwardly from said gate and pivoted to said chute, substantially as set forth.

HENRY J. SPRINGER.

In presence of—
   E. C. SPRINGER,
   R. F. TUNNELL, Jr.